United States Patent
Nguyen

(10) Patent No.: US 7,609,433 B2
(45) Date of Patent: Oct. 27, 2009

(54) ELECTROCHROMIC DEVICE AND METHOD OF MAKING THE SAME

(75) Inventor: Paul Nguyen, San Jose, CA (US)

(73) Assignee: Soladigm, Inc., Santa Rosa, CA (US)

( * ) Notice: Subject to any disclaimer, the term of this patent is extended or adjusted under 35 U.S.C. 154(b) by 0 days.

(21) Appl. No.: 11/778,619

(22) Filed: Jul. 16, 2007

(65) Prior Publication Data

US 2008/0304130 A1    Dec. 11, 2008

Related U.S. Application Data

(60) Provisional application No. 60/933,869, filed on Jun. 7, 2007.

(51) Int. Cl.
*G02F 1/15* (2006.01)
*C09K 19/02* (2006.01)
*G09G 3/19* (2006.01)

(52) U.S. Cl. .................... 359/265; 349/182; 345/49

(58) Field of Classification Search ......... 359/265–270, 359/272–275, 277, 245–247, 254; 345/49, 345/105; 349/182–186; 348/814; 250/70; 438/929

See application file for complete search history.

(56) References Cited

U.S. PATENT DOCUMENTS

| 5,202,788 | A | * | 4/1993 | Weppner ................. 359/270 |
| 5,777,779 | A | | 7/1998 | Hashimoto et al. |
| 6,940,628 | B2 | | 9/2005 | Giron |
| 2007/0097481 | A1 | | 5/2007 | Burdis et al. |
| 2007/0139756 | A1 | * | 6/2007 | Agrawal et al. ............ 359/265 |

OTHER PUBLICATIONS

International Search Report Issued Sep. 22, 2008 for PCT/US2008/066367.

* cited by examiner

*Primary Examiner*—Scott J Sugarman
*Assistant Examiner*—Dawayne A Pinkney

(57) ABSTRACT

An electrochromic device includes a first conductive layer, a dual-layer ion conductor layer, and a second conductive layer. The first ion conductor layer and the second ion conductor layer are formed from different materials and/or by different processes. The layers are deposited using PVD, CVD, or plating techniques.

32 Claims, 2 Drawing Sheets

ELECTROCHROMIC DEVICE AND METHOD OF MAKING THE SAME

This application claims the benefit of U.S. Provisional Patent Application Ser. No. 60/933,869 filed Jun. 7, 2007.

BACKGROUND OF THE INVENTION

1. Field of Invention

The present invention relates to electrochromic devices, and more particularly to electrochromic devices having dual-layer ion conductors and methods for making such ion conductors.

2. Description of the Prior Art

Electrochromic materials are materials that change their optical properties as the result of an applied electrical potential. Such materials can be used to produce electrochromic devices that can vary the transmission or reflectance of electromagnetic radiation via application of an electrical potential. FIGS. 1 and 2 depict a typical prior art electrochromic device 100. Electrochromic device 100 includes an electrochromic (EC) layer 101, an ion conductor (IC) layer 102 and a counter-electrode (CE) layer 103, which may also be electrochromic. Layers 101-103 are positioned between two transparent conducting oxide (TCO) layers 104 and 105.

Typically, EC layer 101 is a cathodic electrochromic material, such as $WO_3$, and CE layer 103 is an anodic electrochromic material, such as nickel oxide $NiO_x$. With ion incorporations, anodic electrochromic materials become bleached (high optical transmission state), whereas cathodic electrochromic materials become colored (low optical transmission state). The ions that move between EC layer 101 and CE layer 103 can be hydrogen ions (H+), lithium ions (Li+), or alkali and alkaline earth ions. When an electrical current is applied through TCO layers 104 and 105 across the EC/IC/CE layers (layers 101/102/103), ions are shuttled between EC layer 101 and CE layer 103 through IC layer 102, leading to switching between bleached and colored states. When in the bleached state, light and heat that is incident on an electrochromic device passes through the device. When in the colored state, only a portion of the light and heat incident on the electrochromic device passes through the device. FIG. 1 depicts an electric potential (e.g. battery 10) being applied between TCO layer 104 and TCO layer 105, and electrochromic device 100 in a bleached state. FIG. 2 depicts a reverse electric potential e.g. battery 210) being applied between TCO layer 015 and TCO layer 104, and electrochromic device 100 in a colored state.

In FIGS. 1 and 2, IC layer 102 serves to electronically insulate EC layer 101 from CE layer 103, while allowing ions to go through. Pinholes in IC layer 102 result in electronic shorts, which can grow with time and usage, thereby resulting in poor reliability, device yield, and color memory. An inorganic solid state thin-film IC layer 102, such as $Ta_2O_5$, is often used in electrochromic 17 switchable-window applications because of its durability with respect to UV and its sturdiness. An inorganic IC layer is often deposited via physical vapor deposition (PVD), such as sputtering or evaporation, or chemical vapor deposition (CVD) techniques, which lead to many pinholes, especially in large-area window applications.

Dual-layer IC layers have been used to address layer delamination and electron flow problems. U.S. Pat. No. 5,777,779 teachers a dual-layer ion conductor layer intended to increase the bond between layers in an electrochromic device. The dual-layer IC layer is formed by processing a first portion of the IC in an atmosphere with water vapor and a second portion of the IC in an atmosphere containing oxygen. U.S. Patent Application Pub. No. 2007/0097481 describes an IC having at least three layers, including two ion transport layers separated by a buffer layer. The three layer IC is used to block electron flow in both directions while permitting ionic conduction, allowing an electrochromic device to have greater dynamic range and stability.

DESCRIPTION OF THE PREFERRED EMBODIMENT

The present invention provides a technique for producing a bilayer ion conductor (IC) layer for an electrochromic device that significantly reduces or even eliminates pinholes in the IC layer, thereby increasing reliability, device yield, dynamic range, coloration uniformity during switching, and color memory of an electrochromic device. Uses of the bilayer ion conductor of the present invention include, but are not limited to, switchable smart windows for a buildings, vehicles, watercraft, aircraft or spacecraft; mirrors; display devices; telecommunication devices; eyewear devices, such as eyeglasses and sunglasses.

Figure 1:
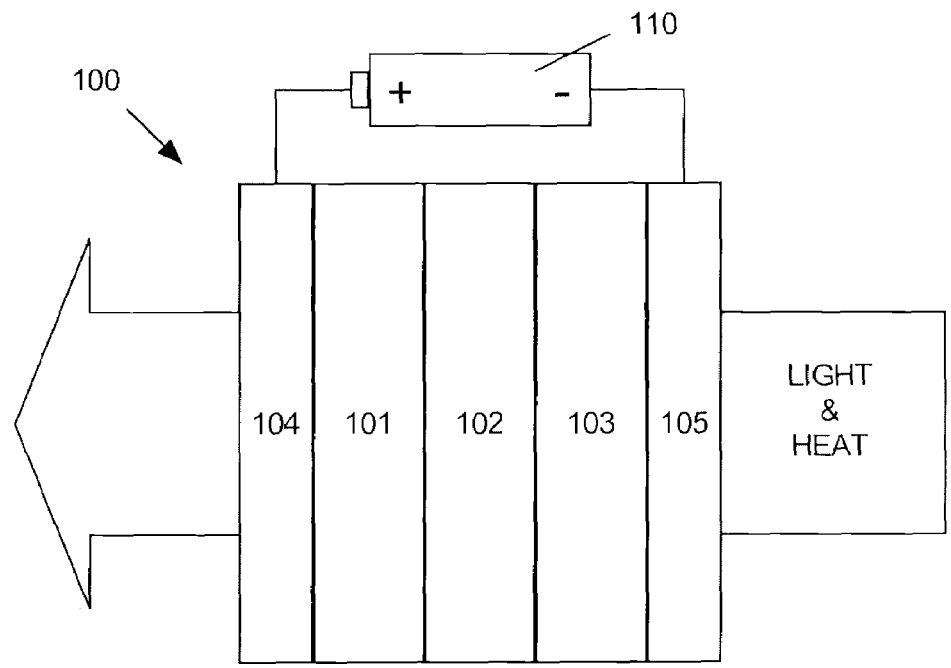
FIG. 1 shows a prior art electrochromic device in a bleached state.
Figure 2:
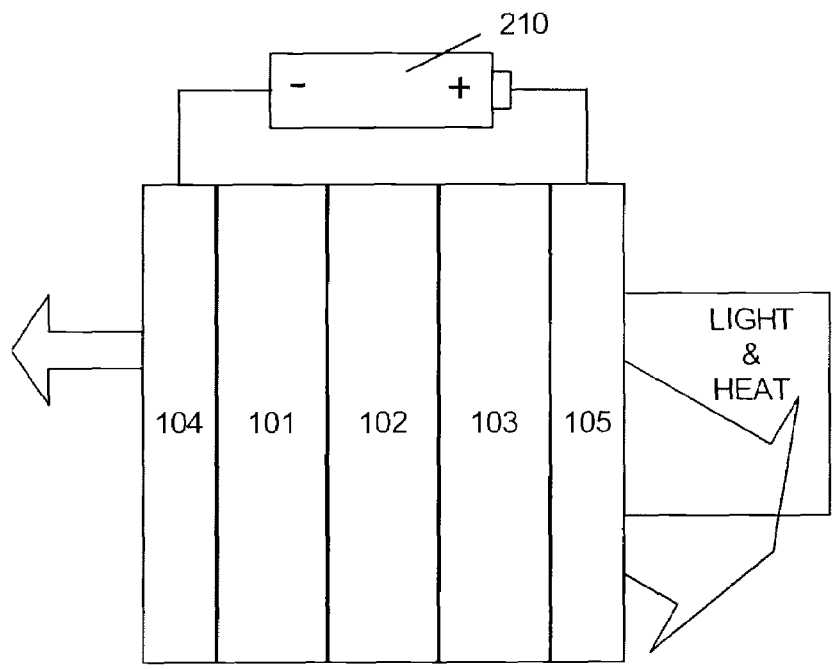
FIG. 2 shows a prior art electrochromic device in a colored state.
Figure 3:
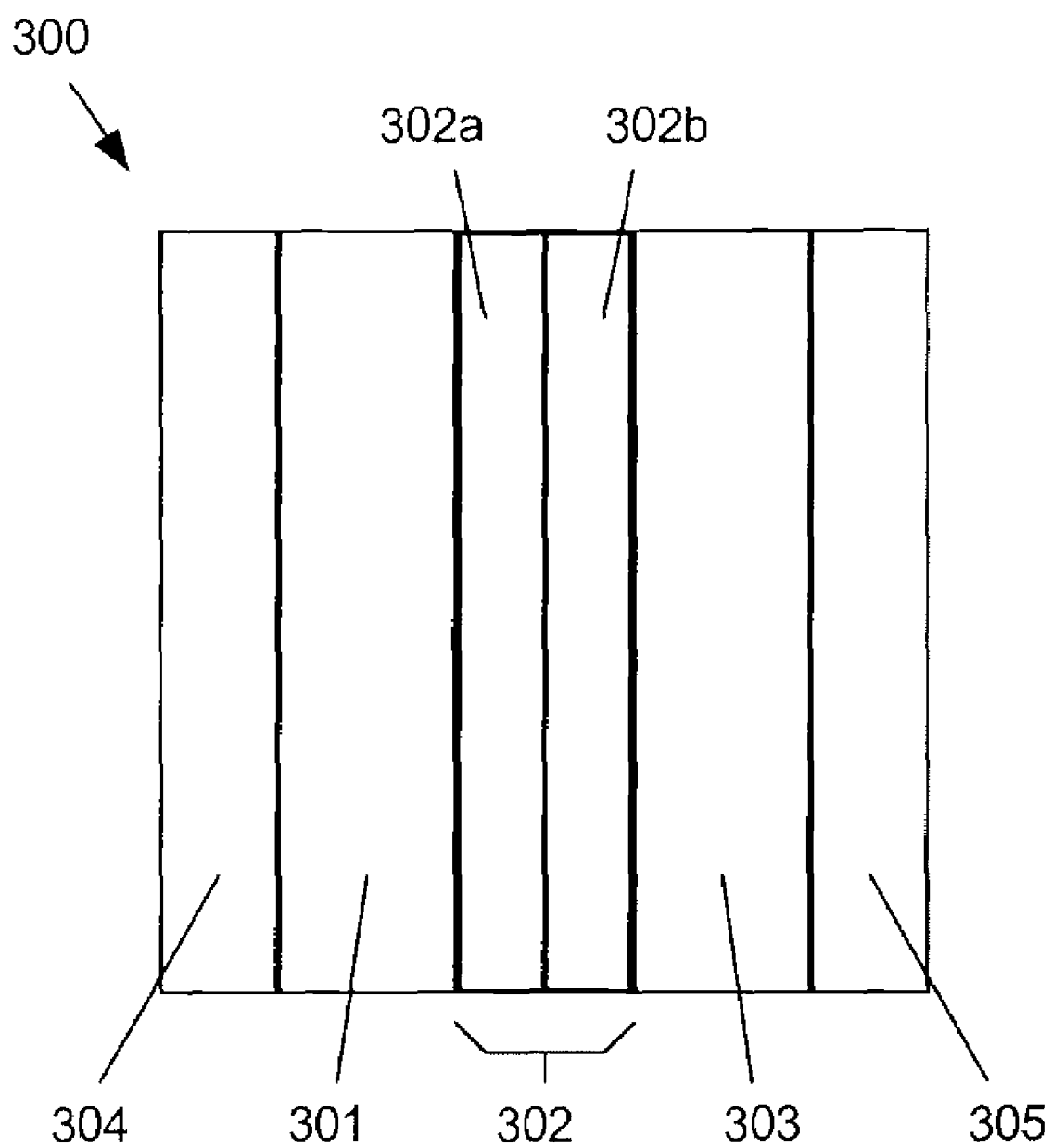
FIG. 3 depicts an electrochromic device having a bi-layer ion conductor (IC) layer.

FIG. 3 shows an electrochromic device 300 according to the present invention. Electrochromic device 300 includes an EC layer 301, an IC layer 302 and a CE layer 303, which may also be electrochromic. Layers 301-303 are positioned between two TCO layers 304 and 305. IC layer 302 is a bilayer ion conductor (IC) layer 302 having first IC layer 302a and second IC layer 302b. IC layers 302a and 302b can be formed from the same ion-conducting material, such as $Ta_2O_5$, $SiO_2$, $Al_2O_3$, $Nb_2O_3$, or $ZrO_2$, using a two-step process, such as a physical vapor deposition (PVD) technique (e.g. sputtering or evaporation), a chemical vapor deposition (CVD) technique, a plating technique, or a combination of these. In one embodiment, both the first and second IC layers 302a and 302b are deposited in an atmosphere containing water vapor and/or oxygen with a partial pressure in the range of about 0.01 mT to about 10 mT. First IC layer 302a can have a thickness of about 30-300 nm, and preferably 50-100 nm, and second IC layer 302b can have a thickness of about 2-300 nm, and preferably 20-30 nm. The deposition dynamics of and the material used for second IC layer 302b covers pin holes formed in first IC layer 302a associated with the deposition dynamics of the material used for first IC layer 302a. That is, the pin holes formed in first IC layer 302a are filled in by forming second IC layer 302b on first IC layer 302a. Thus, the two IC layers 302a and 302b can be formed using the same material but under different reaction/deposition conditions.

In another embodiment, layers 302a and 302b are formed from different materials, such as $Ta_2O_5$ for layer 302a and $SiO_2$ for layer 302b, in a two-step process using, for example, a PVD, a CVD, or a plating technique, or a combination of these. Of course, other combinations of different ion conductor materials could be used, such as $SiO_2$ for layer 302a and $Nb_2O_3$ for layer 302b. In one embodiment, both the first and second IC layers 302a and 302b are deposited in an atmosphere containing water vapor and/or oxygen with a partial pressure in the range of about 0.01 mT to about 50 mT, and preferably 1-10 mT. For this embodiment, layer 302a, when formed from $Ta_2O_5$, can have a thickness of about 30-300 nm, and preferably 50-100 nm, and layer 302b, when formed from $SiO_2$, can have a thickness of about 2-300 nm, and preferably 20-30 nm. The different deposition dynamics of second IC layer 302b cover pinholes of first IC layer 302a better than when the first and second IC layers 302a and 302b are formed from the same material.

Additionally, by using two different materials, ion traps are created at the interface of the first and second IC layers 302a and 302b, in addition to the ion traps formed at the interfaces with their other interfaces. The ion traps formed at the interface of the first and second IC layers 302a and 302b increase the memory effect of the coloring state of the electrochromic layers by preventing the flow of positive ions. Further, the parameters associated with each IC layer can be selected for optimizing the performance of electrochromic device 300. For example, one of the IC layers can exhibit very low electronic conductivity, and yet can be thin enough to maintain a reasonably high ionic conductivity. As a result, less total charge is lost through electronic leakage, leading to faster switching, although the applied voltage will be relatively greater to overcome the ion trapping, particularly when high resistances of the transparent conductors are limiting factors for switching speed. As another result, a relatively low electronic leakage current provides a relatively high coloring state memory of the electrochromic layers.

The invention has been described above with reference to an ion conductor having two layers. This structure may be extended by additional layers in the ion conductor layer. For example, a tri-layer ion conductor layer can be formed by deposition of one or more materials under the same or different processing conditions (e.g. in the presence of water or oxygen).

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for forming an electrochromic device, comprising the steps of:
   (a) forming a first conductive electrochromic layer;
   (b) forming a first ion conductor layer over the first conductive layer;
   (c) forming a second ion conductor layer over the first ion conductor layer, wherein the second ion conductor layer is formed from a different material or using a different deposition technique than the first ion conductor layer;
   (d) forming at least one additional ion conductor layer over the second ion conductor layer, wherein each additional ion conductor layer is formed from a different material or using a different deposition technique than the previously formed ion conductor layer; and
   (e) forming a second conductive counter electrode layer over the last formed additional ion conductor layer.

2. The method of claim 1, wherein the first ion conductor layer includes a first material selected from the group consisting of tantalum oxide, silicon oxide, aluminum oxide, niobium oxide, and zirconium oxide.

3. The method of claim 2, wherein the first ion conductor layer is formed using a deposition technique selected from the group consisting of physical vapor deposition, chemical vapor deposition, and plating.

4. The method of claim 2, wherein the second ion conductor layer includes a second material selected from the group consisting of tantalum oxide, silicon oxide, aluminum oxide, niobium oxide, and zirconium oxide, and the second material is different from the first material.

5. The method of claim 4, wherein the second ion conductor layer is formed using a deposition technique selected from the group consisting of physical vapor deposition, chemical vapor deposition, and plating.

6. The method of claim 5, wherein the first ion conductor layer and the second ion conductor layer are each formed in selected atmospheres, wherein the selected atmospheres maybe the same or different and are selected from the group consisting of water vapor, oxygen, and a mixture of water vapor and oxygen.

7. The method of claim 6, wherein the first conductive layer is a counter-electrode layer, and the second conductive layer is an electrochromic layer.

8. The method of claim 1, wherein the first ion conductor layer is formed using a deposition technique selected from the group consisting of physical vapor deposition, chemical vapor deposition, and plating.

9. The method of claim 8, wherein the second ion conductor layer is formed using a deposition technique selected from the group consisting of physical vapor deposition, chemical vapor deposition, and plating.

10. The method of claim 2, wherein the first ion conductor layer includes a plurality of sublayers of the first material, and adjacent sublayers of the first material are formed using different processing or deposition conditions.

11. The method of claim 10, wherein the sublayers are formed using different atmospheres.

12. The method of claim 11, wherein the different atmospheres are selected from the group consisting of water vapor, oxygen, and a mixture of water vapor and oxygen.

13. The method of claim 4, wherein the second ion conductor layer includes a plurality of sublayers of the second material, and adjacent sublayers of the second material are formed using different processing or deposition conditions.

14. The method of claim 10, wherein the second ion conductor layer includes a second material selected from the group consisting of tantalum oxide, silicon oxide, aluminum oxide, niobium oxide, and zirconium oxide, the second material is different from the first material, the second conductor layer includes a plurality of sublayers of the second material, and adjacent sublayers of the second material are formed using different processing or deposition conditions.

15. An electrochromic device, comprising:
   (a) a first conductive electrochromic layer;
   (b) a first ion conductor layer formed over the first conductive layer;
   (c) a second ion conductor layer formed over the first ion conductor layer, wherein the second ion conductor is formed from a different material or using a different deposition technique than the first ion conductor layer;
   (d) at least one additional ion conductor layer formed over the second ion conductor layer, wherein each additional ion conductor layer is formed from a different material or using a different deposition technique than the previously formed ion conductor layer; and
   (e) a second conductive counter electrode layer formed over the last formed additional ion conductor layer.

16. The electrochromic device of claim 15, wherein the first ion conductor layer includes a first material selected from the group consisting of tantalum oxide, silicon oxide, aluminum oxide, niobium oxide, and zirconium oxide.

17. The electrochromic device of claim 16, wherein the first ion conductor layer is formed using a technique selected from the group consisting of physical vapor deposition, chemical vapor deposition, and plating.

18. The electrochromic device of claim 16, wherein second ion conductor layer includes a second material selected from the group consisting of tantalum oxide, silicon oxide, aluminum oxide, niobium oxide, and zirconium oxide, and the second material is different from the first material.

19. The electrochromic device of claim 18, wherein the second ion conductor layer is formed using a deposition technique selected from the group consisting of physical vapor deposition, chemical vapor deposition, and plating.

20. The electrochromic device of claim 19, wherein first ion conductor layer and the second ion conductor layer are each formed in selected atmospheres, wherein the selected atmospheres may be the same or different and are selected from the group consisting of water vapor, oxygen, and a mixture of water vapor and oxygen.

21. The electrochromic device of claim 20, wherein the first conductive layer is a counter-electrode layer, and the second conductive layer is an electrochromic layer.

22. The electrochromic device of claim 15, wherein the first ion conductor layer is formed using a deposition technique selected from the group consisting of physical vapor deposition, chemical vapor deposition, and plating.

23. The electrochromic device of claim 22, wherein the second ion conductor layer is formed using a deposition technique selected from the group consisting of physical vapor deposition, chemical vapor deposition, and plating.

24. The electrochromic device of claim 16, wherein the first ion conductor layer includes a plurality of sublayers of the first material, and adjacent sublayers of the first material are formed using different processing or deposition conditions.

25. The electrochromic device of claim 24, wherein the sublayers are formed using different atmospheres.

26. The electrochromic device of claim 25, wherein the different atmospheres are selected from the group consisting of water vapor, oxygen, and a mixture of water vapor and oxygen.

27. The electrochromic device of claim 18, wherein the second ion conductor layer includes a plurality of sublayers of the second material, and adjacent sublayers of the second material are formed using different processing or deposition conditions.

28. The electrochromic device of claim 24 wherein the second ion conductor layer includes a second material selected from the group consisting of tantalum oxide, silicon oxide, aluminum oxide, niobium oxide, and zirconium oxide, the second material is different from the first material, the second conductor layer includes a plurality of sublayers of the second material, and adjacent sublayers of the second material are formed using different processing or deposition conditions.

29. The method of claim 1, further comprising providing ions for conduction through the ion conductor layers, wherein the provided ions are selected from the group consisting of hydrogen and lithium ions.

30. The electrochromic device of claim 15, further comprising a source of ions for conduction through the ion conductor layers, wherein the ions are selected from the group consisting of hydrogen and lithium ions.

31. The method of claim 1, wherein ion traps are formed at the interface between the first ion conductor layer and the second ion conductor layer.

32. The electrochromic device of claim 15, wherein ion traps are formed at the interface between the first ion conductor layer and the second ion conductor layer.

* * * * *